US011984087B2

(12) United States Patent
Nam et al.

(10) Patent No.: US 11,984,087 B2
(45) Date of Patent: May 14, 2024

(54) DISPLAY DEVICE AND METHOD OF PERFORMING LOCAL DIMMING THEREOF

(71) Applicant: LG ELECTRONICS INC., Seoul (KR)

(72) Inventors: Yeonoh Nam, Seoul (KR); Kyuyong Chung, Seoul (KR); Jongmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 16/918,846

(22) Filed: Jul. 1, 2020

(65) Prior Publication Data

US 2021/0304689 A1 Sep. 30, 2021

(30) Foreign Application Priority Data

Mar. 31, 2020 (KR) ........................ 10-2020-0039008

(51) Int. Cl.
*G09G 3/34* (2006.01)

(52) U.S. Cl.
CPC ..... *G09G 3/3426* (2013.01); *G09G 2320/064* (2013.01)

(58) Field of Classification Search
CPC ........... G09G 3/3426; G09G 2320/064; G09G 3/3648; G09G 2320/0238; G09G 2320/0646; G09G 2320/0686; G09G 2360/144; G09G 2360/16; G09G 3/342; G02F 1/133365; G02F 1/133615
See application file for complete search history.

(56) References Cited

U.S. PATENT DOCUMENTS

| | | | | |
|---|---|---|---|---|
| 9,292,912 | B2 | 3/2016 | Lee et al. | |
| 9,852,700 | B2 | 12/2017 | Ahn et al. | |
| 10,825,420 | B2 | 11/2020 | Park et al. | |
| 2009/0189543 | A1 * | 7/2009 | Yeo | G09G 3/3426 315/297 |

(Continued)

FOREIGN PATENT DOCUMENTS

| | | |
|---|---|---|
| CN | 109658877 | 4/2019 |
| EP | 3291219 | 3/2018 |

(Continued)

OTHER PUBLICATIONS

Korean Intellectual Property Office Application No. 10-2020-0039008 Office Action dated May 24, 2021, 5 pages.

(Continued)

*Primary Examiner* — Stephen G Sherman
(74) *Attorney, Agent, or Firm* — LEE, HONG, DEGERMAN, KANG & WAIMEY

(57) ABSTRACT

Provided are a display device and an operating method thereof. The display device includes a liquid crystal display panel, a backlight unit including a plurality of light sources for supplying light to the liquid crystal display panel and driven in a state of being divided into a plurality of blocks corresponding to the number of the light sources, and a backlight dimming controller configured to calculate dimming values of the plurality of blocks. The backlight dimming controller is configured to divide each of the plurality of blocks into a plurality of unit blocks and control brightness of an output image differently for each of the unit blocks.

15 Claims, 17 Drawing Sheets

(56) References Cited

U.S. PATENT DOCUMENTS

| | | | | |
|---|---|---|---|---|
| 2018/0061330 A1* | 3/2018 | Jeon | ........................ | G09G 3/342 |
| 2018/0268781 A1* | 9/2018 | Park | .......................... | G09G 5/10 |
| 2019/0107754 A1* | 4/2019 | Sako | .................... | G09G 3/3648 |

FOREIGN PATENT DOCUMENTS

| | | |
|---|---|---|
| EP | 3379523 | 9/2018 |
| JP | 2018055079 | 4/2018 |
| KR | 20100011247 | 2/2010 |
| KR | 10201000012965 | 2/2010 |
| KR | 1020140061103 | 5/2014 |
| KR | 1020150026414 | 3/2015 |
| KR | 1020180106477 | 10/2018 |

OTHER PUBLICATIONS

European Patent Office Application Serial No. 20183590.7, Search Report dated Oct. 16, 2020, 9 pages.

The State Intellectual Property Office of the People's Republic of China Application Serial No. 202010610543.0, Office Action dated Oct. 13, 2023, 3 pages.

* cited by examiner (a) Displayed image (b) Backlight (c) Transmittance

DISPLAY DEVICE AND METHOD OF PERFORMING LOCAL DIMMING THEREOF

CROSS-REFERENCE TO RELATED APPLICATIONS

Pursuant to 35 U.S.C. § 119(a), this application claims the benefit of earlier filing date and right of priority to Korean Patent Application No. 10-2020-0039008, filed on Mar. 31, 2020, the contents of which are all hereby incorporated by reference herein in its entirety.

BACKGROUND

The present disclosure relates to a display device and an operating method thereof, and more particularly, to a display device, which performs local dimming, and an operating method thereof.

An active matrix liquid crystal display device displays moving images using a thin film transistor (hereafter, referred to as a "TFT") that is a switching element. A liquid crystal display device can be manufactured in a small size, as compared with a Cathode Ray Tube (CRT), so it is used for not only a portable information device, an office device, and a display device such as a computer, but also a television. Accordingly, the liquid crystal display device has rapidly replaced the CRT.

A transmissive liquid crystal display device that occupies most of liquid crystal display devices displays an image by modulating light from a backlight unit by controlling an electric field that is applied to a liquid crystal layer.

Meanwhile, backlight dimming methods have been proposed to reduce power consumption of a backlight unit. Local dimming, which is one of the backlight dimming methods, may improve contrast by locally controlling luminance of a display surface within one frame period.

The local dimming method may be a method for separating input image data according to virtual blocks divided in a matrix form on a display screen of a liquid crystal display panel, deriving a representative value of the input image data for each block, and adjusting a dimming value for each block according to the representative value for each block so as to control the brightness of light sources of a backlight unit for each block.

Meanwhile, there may occur a blooming phenomenon in which an image become somewhat bright and becomes unclear because strong light is supplied from a light source corresponding to a dark portion during local dimming but corresponding to an adjacent bright portion.

SUMMARY

The present disclosure provides a display device that minimizes the above-described blooming phenomenon.

The present disclosure provides a display device that minimizes a reduction in brightness of an image during local dimming and improves a blooming problem.

The display device includes a liquid crystal display panel, a backlight unit including a plurality of light sources for supplying light to the liquid crystal display panel and driven in a state of being divided into a plurality of blocks corresponding to the number of the light sources, and a backlight dimming controller configured to calculate dimming values of the plurality of blocks. The backlight dimming controller is configured to divide each of the plurality of blocks into a plurality of unit blocks and control brightness of an output image differently for each of the unit blocks.

wherein brightness of images output through the liquid crystal display panel is differently detected for each of the unit blocks.

wherein the backlight dimming controller is configured to correct dimming values of the plurality of unit blocks based on input image data.

wherein the backlight dimming controller is configured to calculate dimming values of the plurality of blocks based on the input image data and divide each of the plurality of blocks into a plurality of unit blocks so that the plurality of unit blocks have calculated dimming values, respectively.

wherein the backlight dimming controller is configured to correct a dimming value of a unit block corresponding to a boundary region between a bright portion and a dark portion among the plurality of unit blocks divided to have the calculated dimming values, respectively, to be smaller than the calculated dimming value.

wherein the backlight dimming controller is configured to determine an average of the dimming values of the plurality of unit blocks as a representative dimming value of a block to which the unit blocks belong.

wherein the backlight dimming controller is configured to correct the input image data based on dimming values of the plurality of unit blocks.

wherein the backlight dimming controller is configured to determine a correction degree of the image data based on the dimming values of the unit blocks and a representative dimming value of a block to which the unit blocks belong.

wherein the backlight dimming controller is configured to determine a correction degree of a unit block having a dimming value smaller than the representative dimming value to be smaller than a correction degree of a unit block having a dimming value larger than the representative dimming value.

wherein the backlight dimming controller is configured to differently adjust dimming values corrected in the plurality of unit blocks based on surrounding brightness.

wherein the backlight dimming controller is configured to correct the dimming values of the plurality of unit blocks more strongly as the surrounding brightness is darker.

wherein if the backlight dimming controller corrects a dimming value of a first unit block to a first dimming value when the surrounding brightness is a first brightness, the backlight dimming controller is configured to correct the dimming value of the first unit block to a second dimming value smaller than the first dimming value when the surrounding brightness is a second brightness that is darker than the first brightness.

The display device further comprises an illuminance sensor configured to detect the surrounding brightness.

The details of one or more embodiments are set forth in the accompanying drawings and the description below. Other features will be apparent from the description and drawings, and from the claims.

DETAILED DESCRIPTION OF THE EMBODIMENTS

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

It will be understood that, although the terms first, second, etc. may be used herein to describe various elements of the present invention, these terms are only used to distinguish one element from another element and essential, order, or sequence of corresponding elements are not limited by these terms.

A singular representation may include a plural representation unless context clearly indicates otherwise.

It will be understood that the terms "comprise", "include", etc., when used in this specification, specify the presence of several components or several steps and part of the components or steps may not be included or additional components or steps may further be included.

Figure 1:
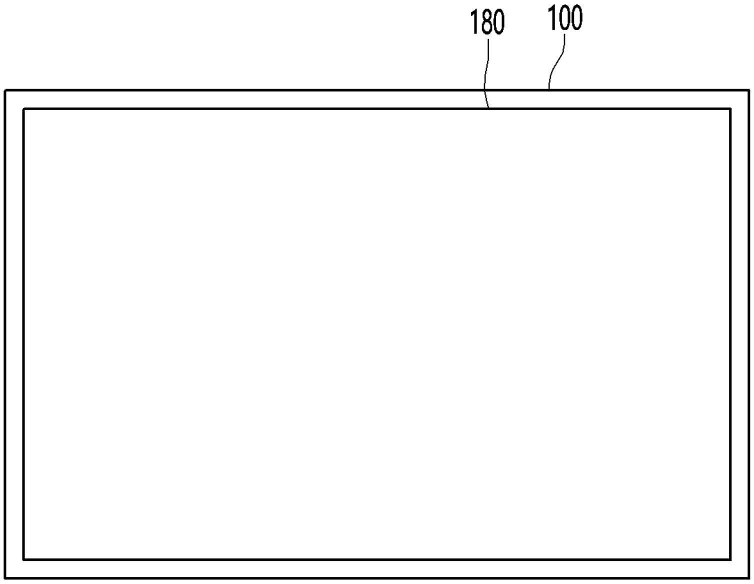
FIG. 1 is a diagram illustrating a display device according to an embodiment of the present invention.

FIG. 1 is a diagram illustrating a display device according to an embodiment of the present invention.

With reference to the drawings, a display device 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (ILED) panel (ILED panel).

According to the present invention, the display 180 is assumed to include a liquid crystal display panel (LCD panel).

On the other hand, examples of the display device 100 in FIG. 1 include a monitor, a TV, a tablet PC, a mobile terminal, and so on.

Figure 2:
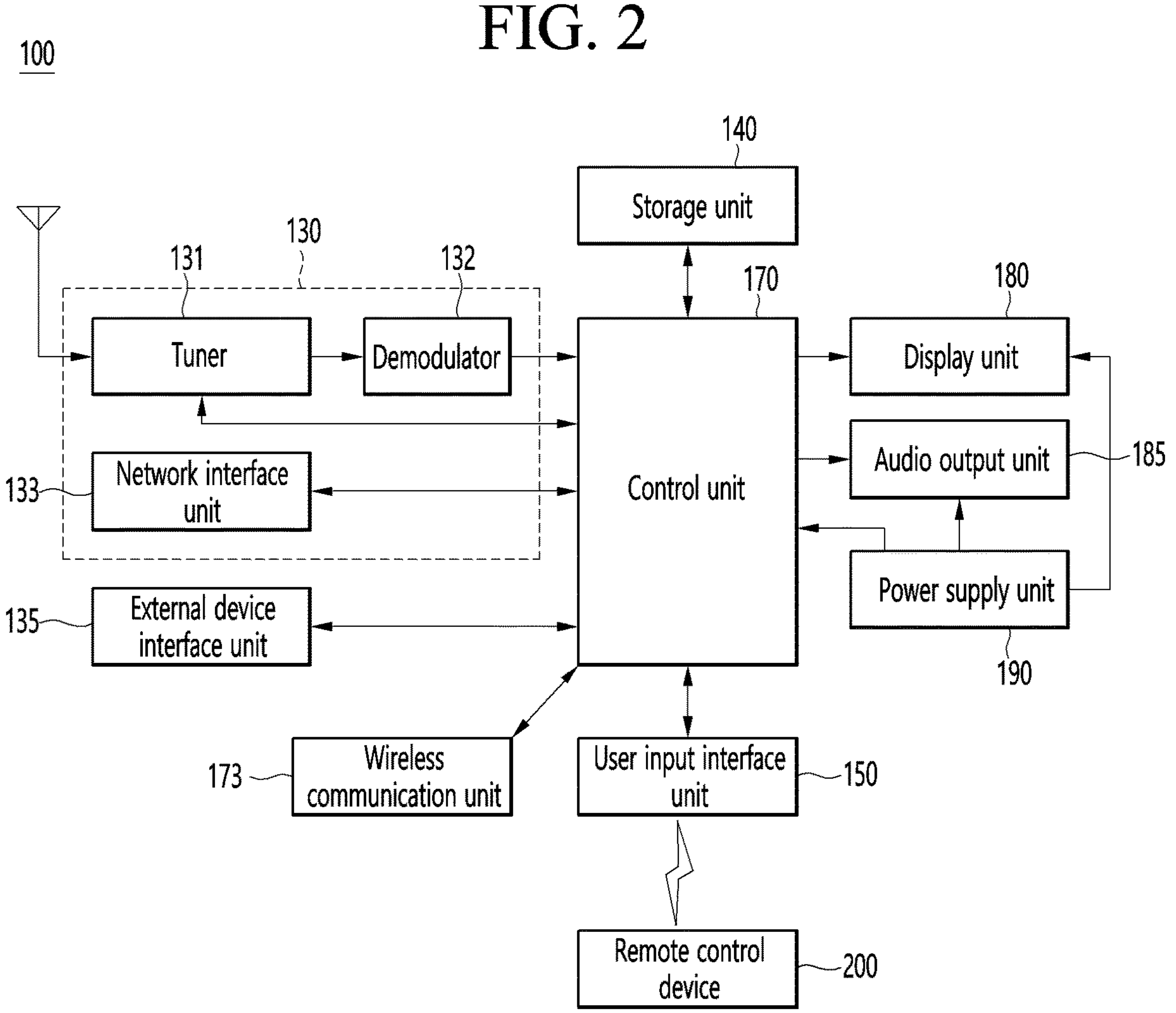
FIG. 2 is an example of a block diagram of the inside of the display device in FIG. 1.

FIG. 2 is an example of a block diagram of the inside of the display device in FIG. 1.

Referring to FIG. 2, a display device 100 can include a broadcast receiver 130, an external device interface 135, a storage 140, a user input interface 150, a controller 170, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote controller 200 or transmit control signals from the controller 170 to the remote controller 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 2 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 2, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 2, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a dc/dc converter for converting a level of the DC source power.

The remote controller 200 transmits a user input to the user input interface 150. To this end, the remote controller 200 may use Bluetooth, radio frequency (RF) communication, infrared (IR) communication, ultra wideband (UWB), ZigBee, or the like. In addition, the remote controller 200 may receive video, audio, or data signal output from the user input interface 150 and display the video, audio, or data signal or output sound.

Figure 3:
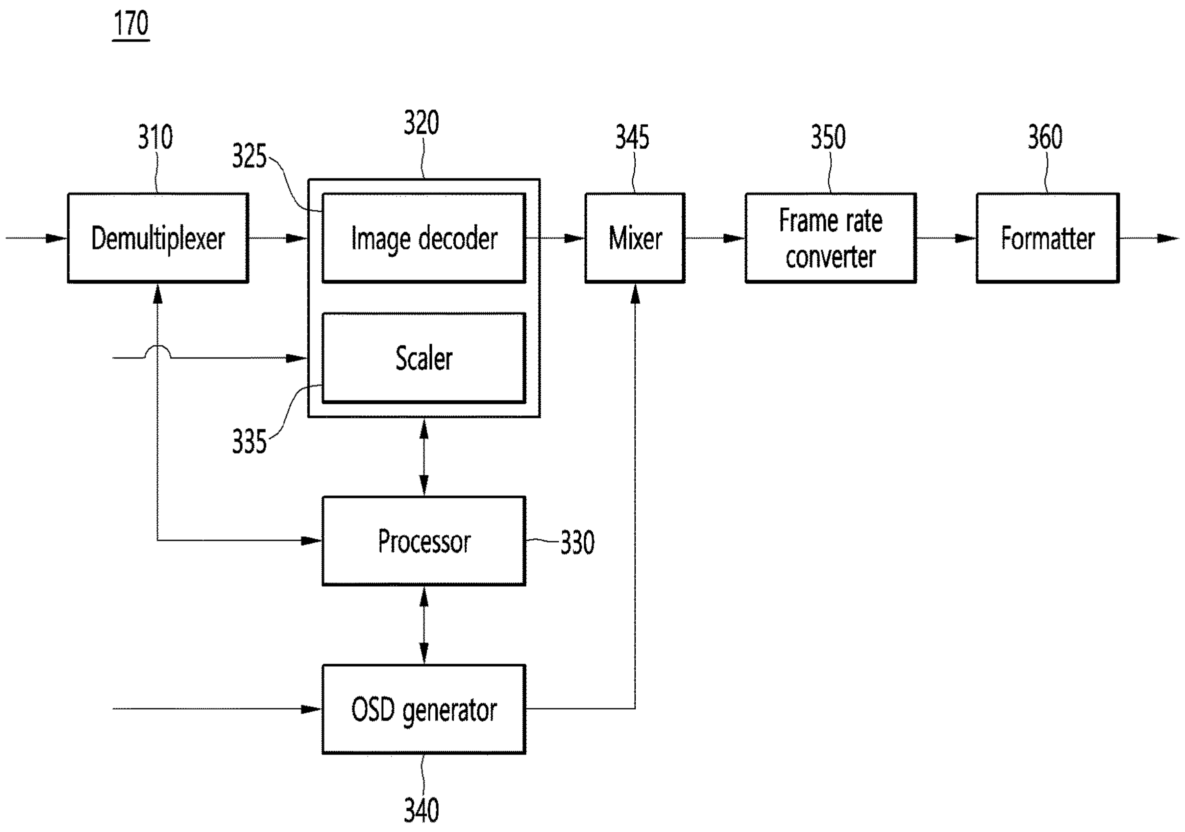
FIG. 3 is an example of a block diagram of the inside of a controller in FIG. 2.

FIG. 3 is an example of a block diagram of the inside of a controller in FIG. 2.

For description with reference to the drawings, the controller 170 according to an embodiment of the present invention includes a demultiplexer 310, an image processor 320, a processor 330, an OSD generator 340, a mixer 345, a frame rate converter 350, and a formatter 360. In addition, an audio processor (not illustrated) and a data processor (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner 110, the demodulator 120, or the external device interface 135.

The image processor 320 performs image processing of the image signal that results from the demultiplexing. To do this, the image processor 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the display device 100 or within the controller 170. For example, the processor 330 controls the tuner 110 in such a manner that the tuner 110 performs the selection of (tuning to) the RF broadcast that corresponds to the channel selected by the user or the channel already stored.

In addition, the processor 330 controls the display device 100 using the user command input through the user input interface 150, or the internal program.

In addition, the processor 330 performs control of transfer of data to and from the network interface 133 or the external device interface 135.

In addition, the processor 330 controls operation of each of the demultiplexer 310, the image processor 320, the OSD generator 340, and so on within the controller 170.

The OSD generator 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the display device 100, various menu screens, a widget, an icon, and so on. In addition, the OSD generated signal includes a 2D object or a 3D object.

In addition, based on a pointing signal input from the remote controller 200, the OSD generator 340 generates a pointer possibly displayed on the display. Particularly, the pointer is generated in a pointing signal processor, and an OSD generator 340 includes the pointing signal processor (not illustrated). Of course, it is also possible that instead of being providing within the OSD generator 340, the pointing signal processor (not illustrated) is provided separately.

The mixer 345 mixes the OSD signal generated in the OSD generator 340, and the image signal that results from the image processing and the decoding in the image processor 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processor (not illustrated) within the controller 170 performs audio processing of an audio signal that results from the demultiplexing. To do this, the audio processor (not illustrated) includes various decoders.

In addition, the audio processor (not illustrated) within the controller 170 performs processing for base, treble, volume adjustment and so on.

The data processor (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4A:
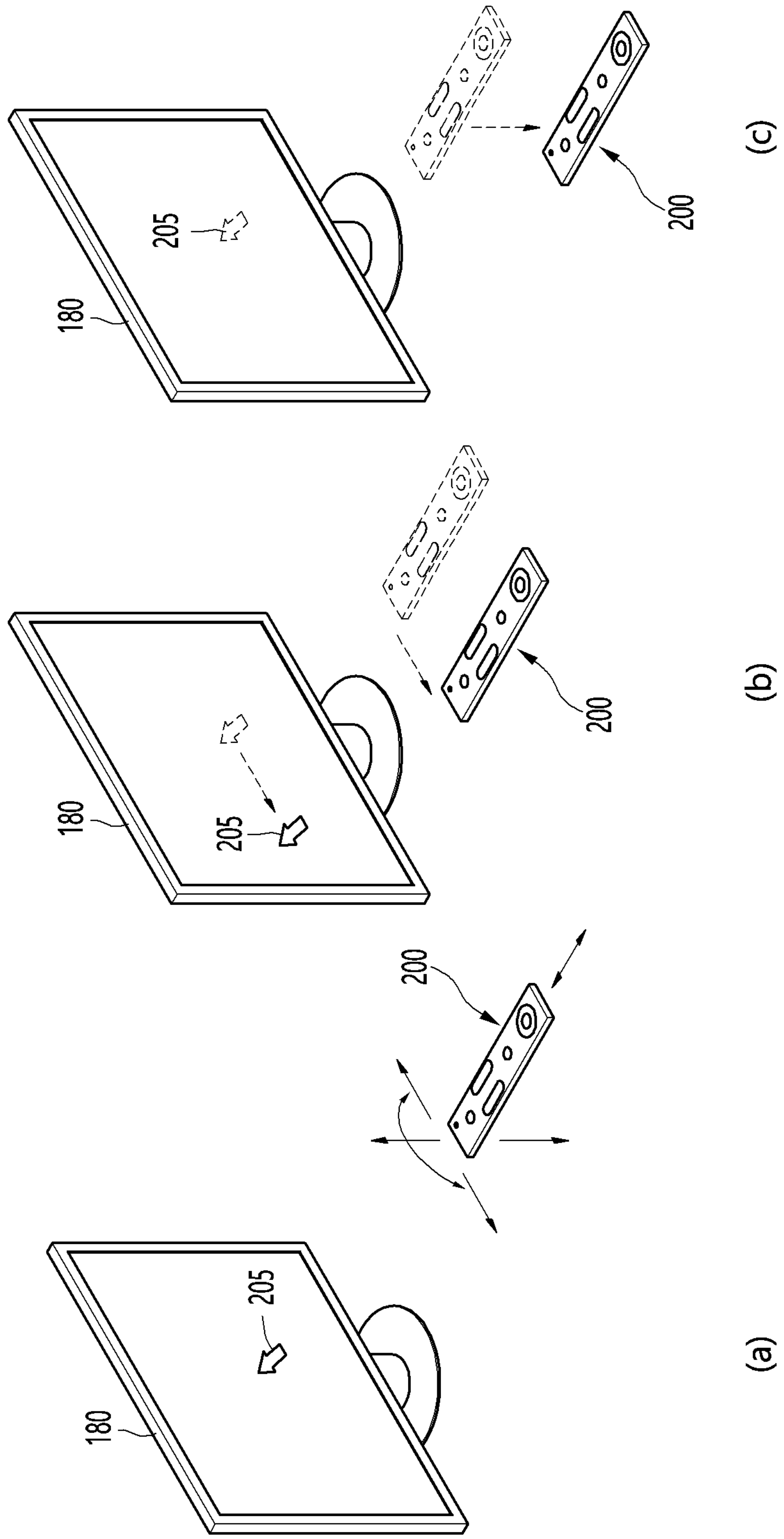
FIG. 4A is a diagram illustrating a method in which the remote controller in FIG. 2 performs control.

FIG. 4A is a diagram illustrating a method in which the remote controller in FIG. 2 performs control.

In FIG. 4A(a), it is illustrated that a pointer 205 which corresponds to the remote controller 200 is displayed on the display 180.

The user moves or rotates the remote controller 200 upward and downward, leftward and rightward (FIG. 4A(b)), and forward and backward (FIG. 4A(c)). The pointer 205 displayed on the display 180 of the display device corresponds to movement of the remote controller 200. As in the drawings, movement of the pointer 205, which depends on the movement of the remote controller 200 in a 3D space, is displayed and thus, the remote controller 200 is named a spatial remote controller or a 3D pointing device.

FIG. 4A(b) illustrates that, when the user moves the remote controller 200 leftward, the pointer 205 displayed on the display 180 of the display device correspondingly moves leftward.

Information on the movement of the remote controller 200, which is detected through a sensor of the remote controller 200, is transferred to the display device. The display device calculates the information on the movement of the remote controller 200 from coordinates of the pointer 205. The display device displays the pointer 205 in such a manner that the pointer 25 corresponds to the calculated coordinates.

FIG. 4A(c) illustrates a case where the user moves the remote controller 200 away from the display 180 in a state where a specific button within the remote controller 200 is held down. Accordingly, a selection area within the display 180, which corresponds to the pointer 205, is zoomed in so that the selection area is displayed in an enlarged manner. Conversely, in a case where the user causes the remote controller 200 to approach the display 180, the selection area within the display 180, which corresponds to the pointer 205, is zoomed out so that the selection is displayed in a reduced manner. On the other hand, in a case where the remote controller 200 moves away from the display 180, the selection area may be zoomed out, and in a case where the remote controller 200 approaches the display 180, the selection area may be zoomed in.

On the other hand, an upward or downward movement, or a leftward or rightward movement is not recognized in a state where a specific button within the remote controller 200 is held down. That is, in a case where the remote controller 200 moves away from or approaches the display 180, only a forward or backward movement is set to be recognized without the upward or downward movement, or the leftward or rightward movement being recognized. Only the pointer 205 moves as the remote controller 200 moves upward, downward, leftward, or rightward, in a state where a specific button within the remote controller 200 is not held down.

On the other hand, a moving speed or a moving direction of the pointer 205 corresponds to a moving speed or a moving direction of the remote controller 200, respectively.

Figure 4B:
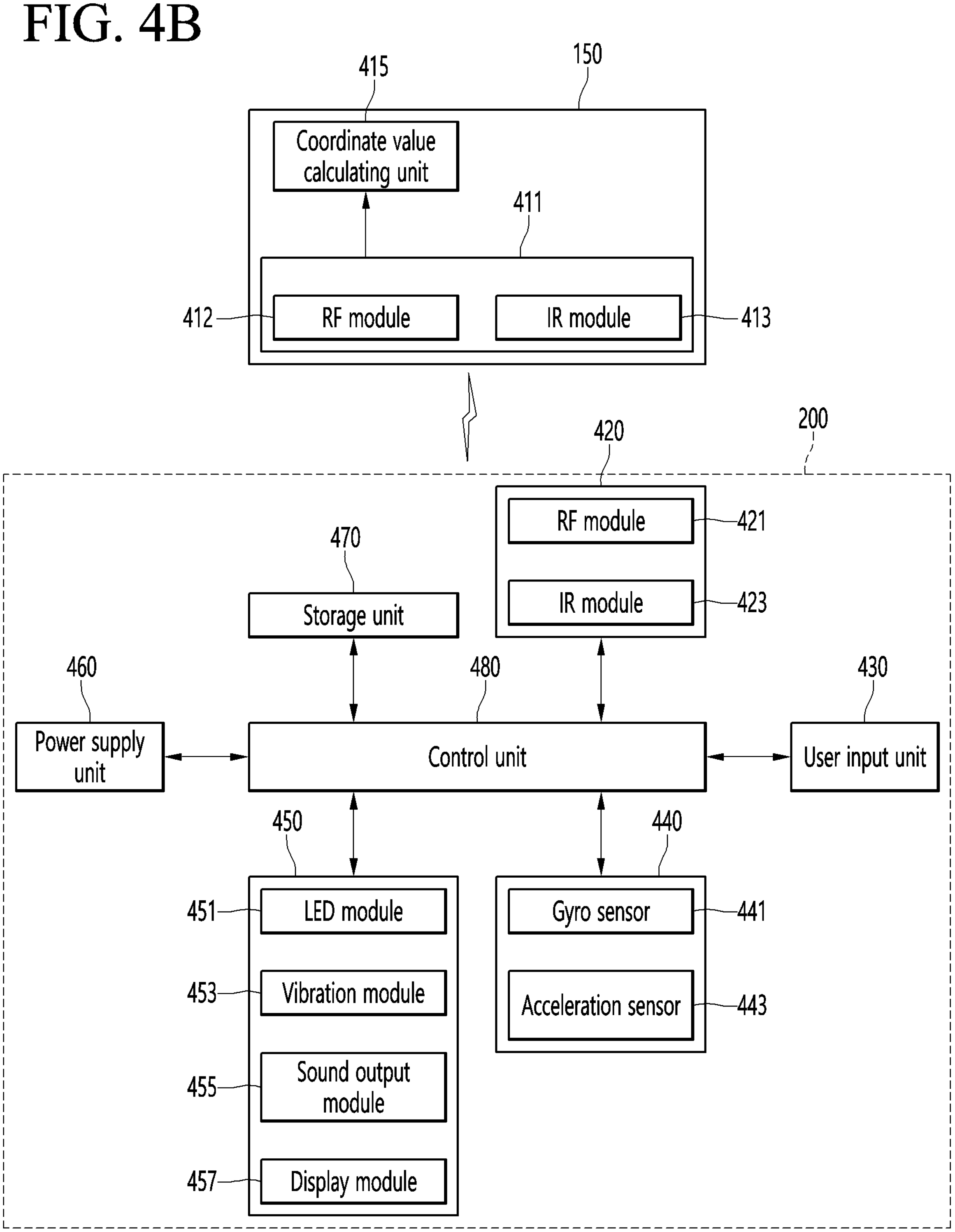
FIG. 4B is a block diagram of the inside of the remote controller in FIG. 2.

FIG. 4B is a block diagram of the inside of the remote controller in FIG. 2.

For description with reference to the drawings, the remote controller 200 includes a wireless communication interface 420, a user input interface 430, a sensor 440, an output interface 450, a power supply 460, a memory 470, and a controller 480.

The wireless communication interface 420 transmits and receives a signal to and from an arbitrary one of the display devices according to the embodiments of the present invention, which are described above. Of the display devices according to the embodiments of the present invention, one display device is taken as an example for description.

According to the present embodiment, the remote controller 200 includes an RF module 421 that transmits and receives a signal to and from the display device 100 in compliance with RF communication standards. In addition, the remote controller 200 includes an IR module 423 that possibly transmits and receives a signal to and from the display device 100 in compliance with IR communication standards.

According to the present embodiment, the remote controller 200 transfers a signal containing information on the movement of the remote controller 200 to the display device 100 through the RF module 421.

In addition, the remote controller 200 receives a signal transferred by the display device 100, through the RF module 421. In addition, the remote controller 200 transfers a command relating to power-on, power-off, a channel change, or a volume change, to the display device 100, through the IR module 423, whenever needed.

The user input interface 430 is configured with a keypad, buttons, a touch pad, a touch screen, or so on. The user inputs a command associated with the display device 100 into the remote controller 200 by operating the user input interface 430. In a case where the user input interface 430 is equipped with a physical button, the user inputs the command associated with the display device 100 into the remote controller 200 by performing an operation of pushing down the physical button. In a case where the user input interface 430 is equipped with a touch screen, the user inputs the command associated with the display device 100 into the remote controller 200 by touching on a virtual key of the touch screen. In addition, the user input interface 430 may be equipped with various types of input means operated by the user, such as a scroll key or a jog key, and the present embodiment does not impose any limitation on the scope of the present invention.

The sensor 440 includes a gyro sensor 441 or an acceleration sensor 443. The gyro sensor 441 senses information on the movement of the remote controller 200.

As an example, the gyro sensor 441 senses the information on operation of the remote controller 200 on the x-, y-, and z-axis basis. The acceleration sensor 443 senses information on the moving speed and so on of the remote controller 200. On the other hand, a distance measurement sensor is further included. Accordingly, a distance to the display 180 is sensed.

The output interface 450 outputs an image or an audio signal that corresponds to the operating of the user input interface 430 or corresponds to a signal transferred by the display device 100. Through the output interface 450, the user recognizes whether or not the user input interface 430 is operated or whether or not the display device 100 is controlled.

As an example, the output interface 450 includes an LED module 451, a vibration module 453, an audio output module 455, or a display module 457. The LED module 451, the vibration module 453, the audio output module 455, and the display module 457 emits light, generates vibration, outputs audio, or outputs an image, respectively, when the input interface 435 is operated, or a signal is transmitted and received to and from the display device 100 through a wireless communication interface 420.

The power supply 460 supplies a power to the remote controller 200. In a case where the remote controller 200 does not move for a predetermined time, the power supply 460 reduces power consumption by interrupting power supply. In a case where a predetermined key provided on the remote controller 200 is operated, the power supply 460 resumes the power supply.

Various types of programs, pieces of application data, and so on that are necessary for control or operation of the remote controller 200 are stored in the memory 470. In a case where the remote controller 200 transmits and receives a signal to and from the display device 100 in a wireless manner through the RF module 421, the signal is transmitted and received in a predetermined frequency band between the remote controller 200 and the display device 100. The controller 480 of the remote controller 200 stores information on, for example, a frequency band in which data is transmitted and received in a wireless manner to and from the display device 100 paired with the remote controller 200, in the memory 470, and makes a reference to the stored information.

The controller 480 controls all operations associated with the control by the remote controller 200. The controller 480 transfers a signal that corresponds to operating of a predetermined key of the user input interface 430, or a signal that corresponds to the movement of the remote controller 200, which is sensed in the sensor 440, to the display device 100 through the wireless communication interface 420.

A user input interface 150 of the display device 100 includes a wireless communication interface 411 that transmits and receives a signal in a wireless manner to and from the remote controller 200, and a coordinate value calculator 415 that calculates a coordinate value of the pointer, which corresponds to the operation of the remote controller 200.

The user input interface 150 transmits and receives the signal in a wireless manner to and from the remote controller 200 through the RF module 412. In addition, a signal transferred in compliance with the IR communication standards by the remote controller 200 through the IR module 413 is received.

The coordinate value calculator 415 calculates a coordinate value (x, y) of the pointer 205 to be displayed on the display 180, which results from compensating for a hand movement or an error, from a signal that corresponds to the operation of the remote controller 200, which is received through the wireless communication interface 411.

A transfer signal of the remote controller 200, which is input into the display device 100 through the user input interface 150 is transferred to the controller 170 of the display device 100. The controller 170 determines information on the operation of the remote controller 200 and information on operating of a key, from the signal transferred by the remote controller 200, and correspondingly controls the display device 100.

As another example, the remote controller 200 calculates a coordinate value of a pointer, which corresponds to the operation of the remote controller 200, and outputs the calculated value to the user input interface 150 of the display device 100. In this case, the user input interface 150 of the display device 100 transfers information on the received coordinate values of the pointer, to the controller 170, without performing a process of compensating for the hand movement and the error.

In addition, as another example, unlike in the drawings, it is also possible that the coordinate value calculator 415 is included within the controller 170 instead of the user input interface 150.

Figure 5:
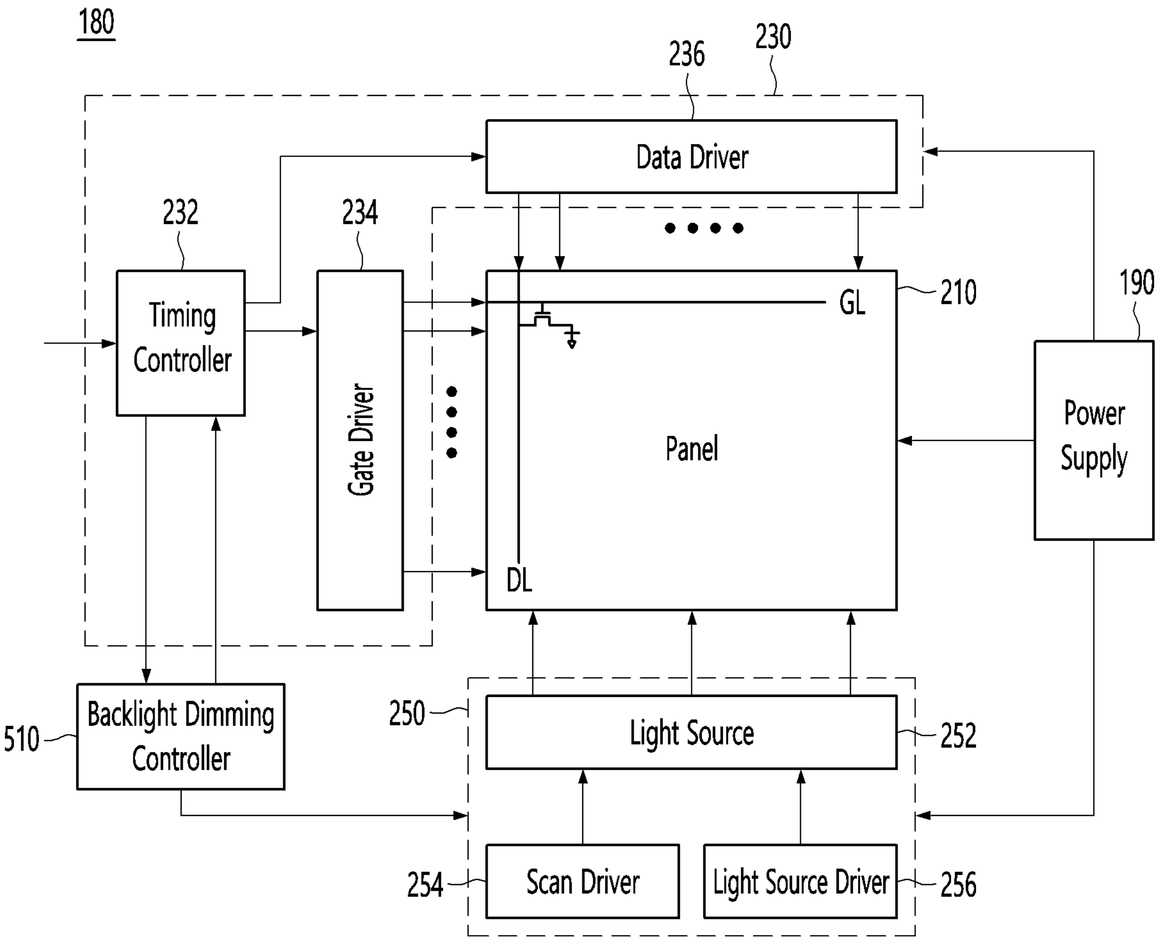
FIG. 5 is a block diagram of the inside of the power supply and the display of FIG. 2.

FIG. 5 is a block diagram of the inside of the power supply and the display of FIG. 2.

Referring to the figure, the display 180 based on a liquid crystal panel (LCD panel) may include a liquid crystal display panel 210, a driving circuit 230, a backlight unit 250, and a backlight dimming controller 510.

The liquid crystal display panel 210, in order to display an image, includes: a first substrate in which a plurality of gate lines GL and data lines DL are disposed across each other in a matrix shape, thin film transistors and pixel electrodes connected with the thin film transistors are formed at the intersections; a second substrate having common electrodes; and a liquid crystal layer formed between the first substrate and the second substrate.

The driving circuit 230 drives the liquid crystal display panel 210 in response to a control signal and a data signal that are supplied from the controller 170 of FIG. 1. To this end, the driving circuit 230 includes a timing controller 232, a gate driver 234, and a data driver 236.

The timing controller 232 receives a control signal, R, G, B data signal, a vertical synchronization signal Vsync etc. from the controller 170, controls the gate driver 234 and the data driver 236 in response to the control signal, and rearranges and provides the R, G, B data signal to the data driver 236.

By control of the gate driver 234, the data driver 236, and the timing controller 232, a scan signal and an image signal are supplied to the liquid crystal display panel 210 through a gate line GL and a data line DL.

The backlight unit 250 supplies light to the liquid crystal display panel 210. To this end, the backlight unit 250 may include a plurality of light sources 252, a scan driver 254 that controlling scanning driving of the light sources 252, and a light source driver 256 that turns on/off the light sources 252.

A predetermined image is displayed using light emitted from the backlight unit 250 with the light transmittance of the liquid crystal layer adjusted by an electric field generated between the pixel electrode and the common electrode of the liquid crystal display panel 210.

The power supply 190 can supply a common electrode voltage Vcom to the liquid crystal display panel 210 and a gamma voltage to the data driver 236. Further, the power supply 190 can supply driving power for driving the light sources 252 to the backlight unit 250.

Meanwhile, the backlight unit 250 can be divided and driven into a plurality of blocks. The controller 170 can control the display 180 to perform local dimming by setting a dimming value for each block. In detail, the timing controller 232 can output input image data RGB to the backlight dimming controller 510 and the backlight dimming controller 510 can calculate a dimming value for each of a plurality of blocks on the basis of the input image data RGB received from the timing controller 232.

Figure 6:
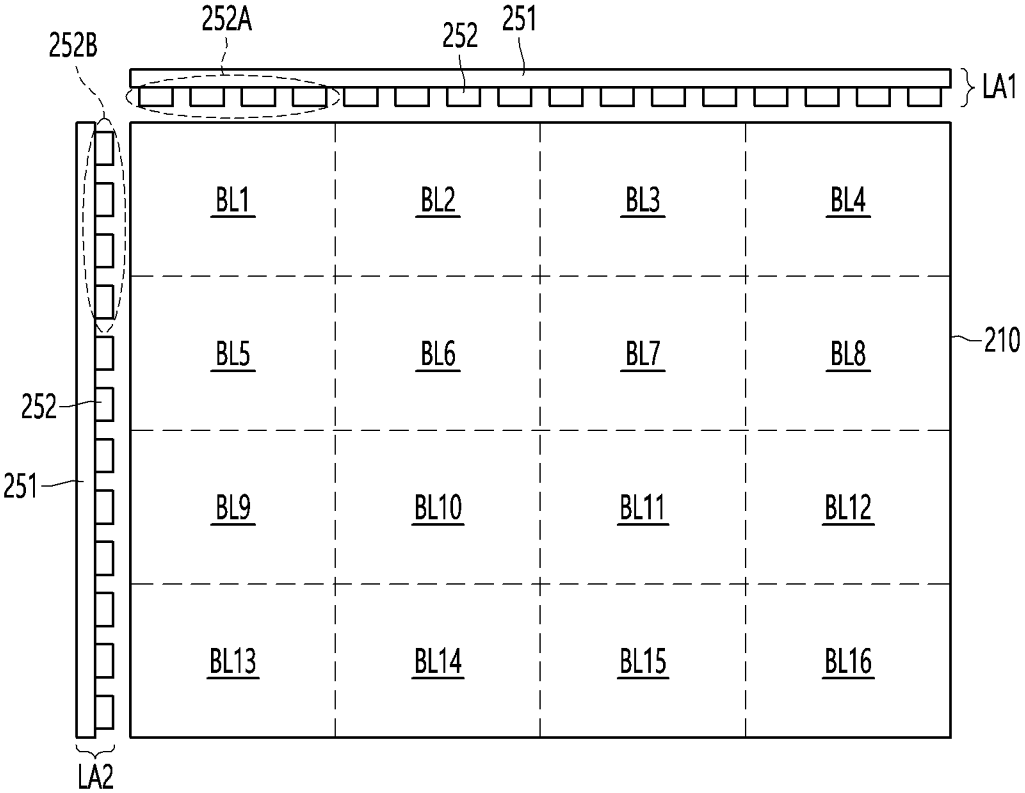
FIG. 6 is an example showing arrangement of a liquid crystal display panel and light sources in an edge type backlight unit.
Figure 7:
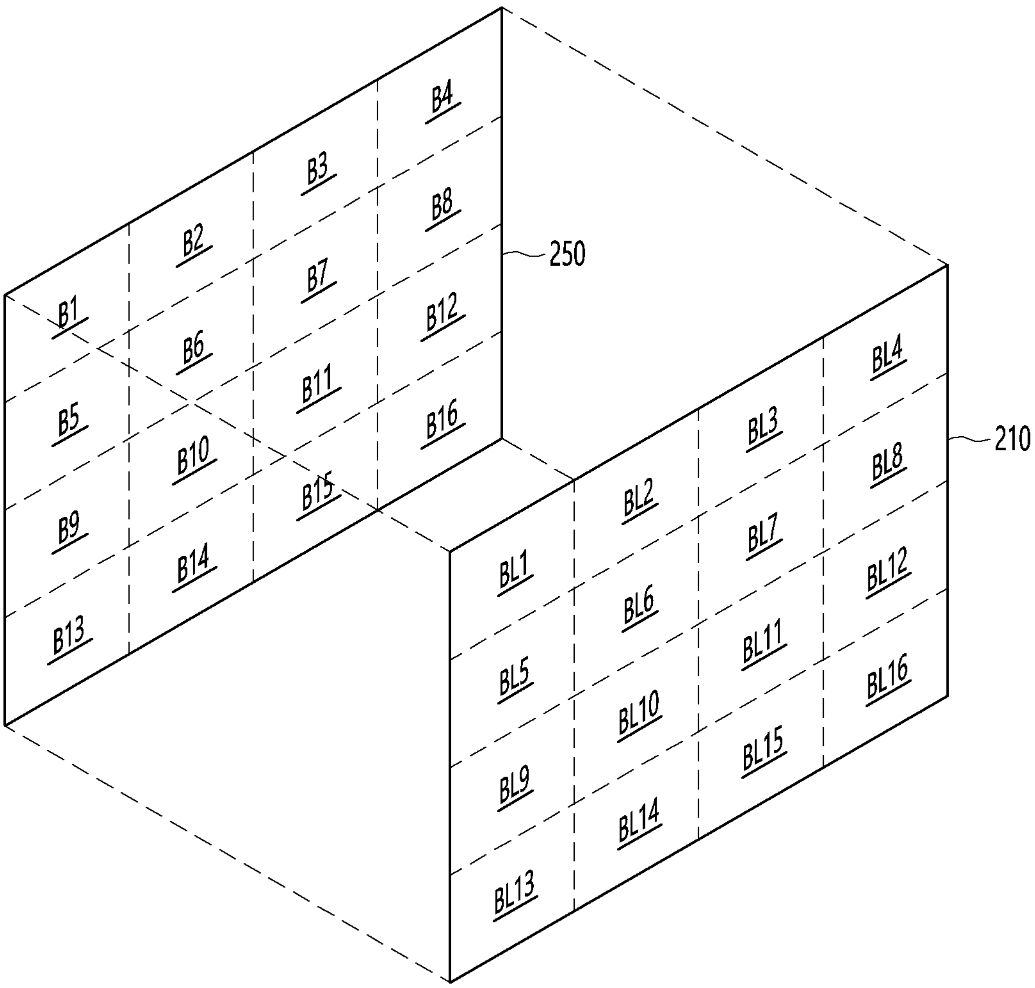
FIG. 7 is an example showing arrangement of a liquid crystal display panel and light sources in a direct-type backlight unit.

FIG. 6 is an example showing arrangement of a liquid crystal display panel and light sources in an edge type backlight unit and FIG. 7 is an example showing arrangement of a liquid crystal display panel and light sources in a direct-type backlight unit.

The liquid crystal display panel 210 may be divided into a plurality of virtual blocks, as shown in FIGS. 6 and 7. Although the liquid crystal display panel 210 is equally divided into sixteen blocks BL1 to BL16 in FIGS. 6 and 7, it should be noted that the liquid crystal display panel 210 is not limited thereto. Each of the blocks may include a plurality of pixels.

The backlight unit 250 may be implemented into any one of an edge type and direct type.

The edge-type backlight unit 250 has a structure in which a plurality of optical sheets and a light guide plate are stacked under the liquid crystal display panel 210 and a plurality of light sources is disposed on the sides of the light guide plate. When the backlight unit 250 is an edge-type backlight unit, the light sources are disposed on at least any one of the top and the bottom and at least any one of the left and right sides of the liquid crystal display panel 210. It is exemplified in FIG. 6 that a first light source array LA1 is disposed on the top of the liquid crystal display panel 210 and a second light source array LA2 is disposed on the left side of the liquid crystal display panel 210. The first and second light source arrays LA1 and LA2 each include a plurality of light sources 252 and a light source circuit board 251 on which the light sources 252 are mounted. In this case, the brightness of the light traveling into the first block BL2 of the light source array can be adjusted using the light sources 252A of the first light source array LA1 disposed at a position corresponding to the first block BL2 and the light sources 252B of the second light source array LA2.

The direct-type backlight unit 250 has a structure in which a plurality of optical sheets and a diffuser plate are stacked under the liquid crystal display panel 210 and a plurality of light sources is disposed under the diffuser plate. When the backlight unit 250 is a direct-type backlight unit, it is divided to correspond one to one to the blocks BL1 to BL16 of the liquid crystal display panel 210, as shown in FIG. 7. In this case, the brightness of the light traveling into the first block BL2 of the light source array can be adjusted using the light sources 252 included in the first block B1 of the backlight unit 250 disposed at a position corresponding to the first block BL1 of the liquid crystal display panel 210.

The light sources 252 may be point light sources such as a Light Emitting Diode (LED). The light sources 252 are turned on and off in response to light source driving signals LDS from the light source driver 256. The light sources 252 can be adjusted in intensity of light in accordance with the amplitudes of the light source driving signals LDS and can be adjusted in turning-on time in accordance with the pulse width. The brightness of light that is outputted from the light sources 252 may be adjusted in accordance with the light source driving signal LDS.

The light source driver 256 can generate and output light source driving signals LDS to the light sources 252 on the basis of the dimming values of the blocks inputted from the backlight dimming controller 510. The dimming values of the blocks, which are values for performing local dimming, may be the brightness of the light that is outputted from the light sources 252.

Figure 8:
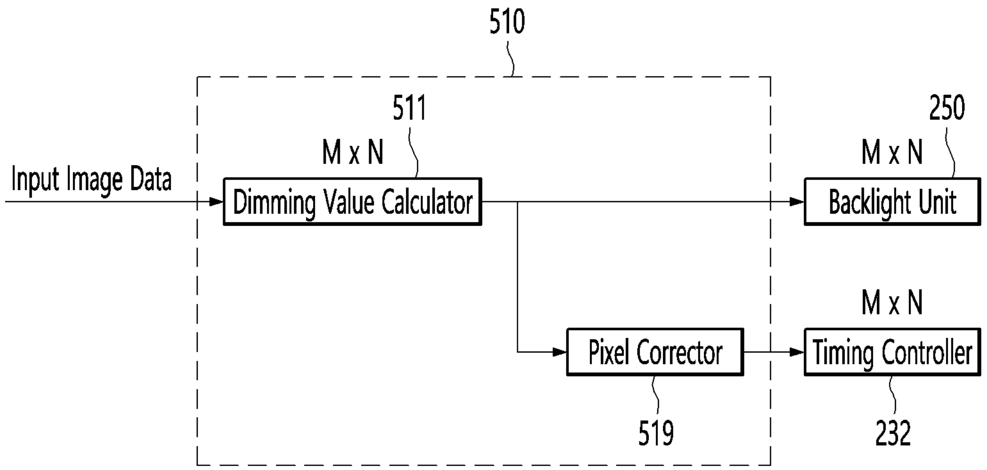
FIG. 8 is a block diagram illustrating the internal configuration of the backlight dimming controller, the backlight unit, and the timing controller for explaining local dimming according to comparative example.
Figure 9:
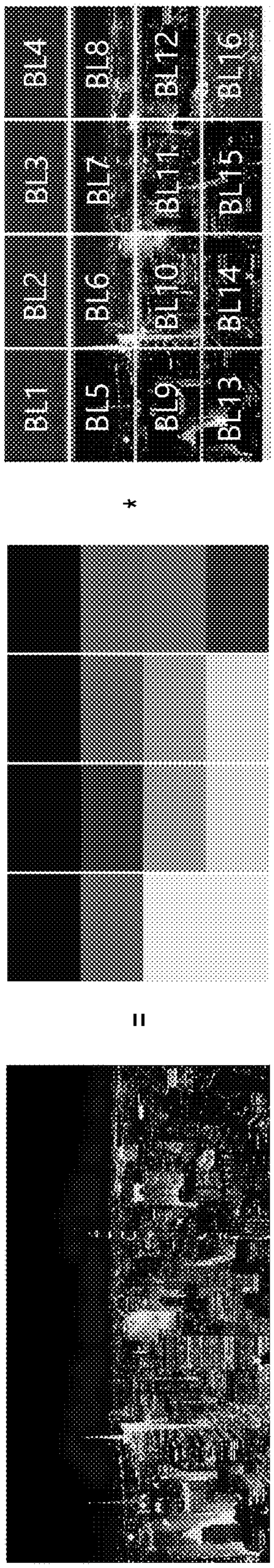
FIG. 9 is an exemplary diagram illustrating a method for displaying an image by local dimming according to comparative example.

FIG. 8 is a block diagram illustrating the internal configuration of the backlight dimming controller, the backlight unit, and the timing controller for explaining local dimming according to comparative example, and FIG. 9 is an exemplary diagram illustrating a method for displaying an image by local dimming according to comparative example.

The backlight dimming controller 510 may include at least part or all of a dimming value calculator 511 and a pixel corrector 519.

The dimming value calculator 511 may receive input image data RGB. The dimming value calculator 511 may receive image data input from the controller 170. The dimming value calculator 511 may calculate dimming values of a plurality of blocks based on the input image data.

For example, when the number of light sources 252 is M×N, the dimming value calculator 511 may calculate the dimming values of the M×N blocks.

The dimming value calculator 511 may calculate the dimming values of the plurality of blocks based on the average brightness and maximum brightness of pixels of each block and brightness of the adjacent blocks.

For example, the dimming value calculator 511 may select a smaller value among the set maximum value and the averages considering the weight for each pixel value as the initial dimming value, and may enhance the dimming value through the weighting by recognizing a corresponding region as a dark region when the initial dimming value is greater than the average brightness and the average brightness is less than the threshold value.

As another example, the dimming value calculator 511 may analyze the input image data RGB in block units of the liquid crystal display panel 210 to calculate a representative value of each of the blocks. The representative value may be the sum of the input image data RGB of each block, the average value of the input image data RGB of each block, or the maximum value of the input image data RGB of each block. The dimming value calculator 511 may calculate dimming values of blocks according to representative values of blocks. The dimming value calculator 511 may calculate the dimming value of the block in proportion to the representative value of any one block. Therefore, as the representative value of the block is larger, the dimming value of the block may be calculated as a larger value.

In addition, the dimming value calculator 511 may calculate the dimming values of the blocks in various methods based on the input image data RGB. That is, the dimming value calculator 511 may reduce the brightness of light output by the light sources 252 of the block corresponding to the dark portion of the image and may calculate the dimming value so that the brightness of the light output from the light sources 252 of the block corresponding to the bright portion of the image is increased.

The backlight unit 250 may control the light sources 252 based on the dimming values of the blocks received from the dimming value calculator 511.

The pixel corrector 519 may compensate for the input image data RGB of the block as much as the reduction of the dimming value of any one block. For example, when the dimming value of any one block is reduced more than a reference value, light of about half brightness is provided from the light sources 252, as compared with the case in which the local dimming is not performed. In this case, since the luminance of the corresponding block of the liquid crystal display panel 210 is too low, the pixel corrector 519 may up-regulate the input image data RGB of the corresponding block of the liquid crystal display panel 210. In this case, when the dimming value of the corresponding block is reduced by a certain ratio, how much the input image data RGB of the block is up-regulated may be preset.

The pixel corrector 519 may correct the input image data RGB based on the dimming value calculated by the dimming value calculator 511, and the timing controller 232 may adjust the transmittance based on the corrected input image data RGB'.

FIG. 9A is an example of an image output from the display 180, and the image output from the display 180 may be determined by the brightness of the light output by the backlight unit 250 and the transmittance of the liquid crystal layer adjusted by the timing controller 232. FIG. 9B may illustrate the brightness of light of the blocks BL1 to BL16 output by the backlight unit 250, and FIG. 9C may illustrate the transmittance of the liquid crystal layer.

As described above, when local dimming in which the brightness and transmittance of light for each of the plurality of blocks are adjusted is performed, the power consumption of the backlight unit 250 may be reduced and the contrast of the output image may be improved.

Meanwhile, even when local dimming is performed, problems such as blooming may occur.

Figure 10:
FIG. 10 is an exemplary diagram in which blooming occurring in an image is expressed.

FIG. 10 is an exemplary diagram in which blooming occurring in an image is expressed.

Blooming may refer to a phenomenon in which, when the light is partially brightened, the image portion becomes bright as if it is blurred, and the image becomes unclear.

As an example, although the brightness of the first block should be dark and the brightness of the second block adjacent to the first block should be bright, blooming may occur because the first block is brightened by a light source that outputs light to the second block.

As another example, when a dark portion and a bright portion are present in the same block, blooming in which the dark portion is brightly illuminated may occur.

Referring to the example of FIG. 10, a region indicated by a dashed line is a boundary region between a dark portion and a bright portion. It can be seen that the dark portion is slightly brightened by the light source that outputs the light to the bright portion.

Therefore, a method for minimizing blooming occurring during local dimming may be required. To this end, the display device 100 according to the embodiment of the present disclosure minimizes blooming by compensating for the dimming value or image data on the assumption that there are more blocks than the blocks divided so as to correspond to the actual light source 252.

In detail, in the local dimming according to comparative example, the dimming value and transmittance are determined by dividing the block into the same number as the number of the light sources 252, but the display device 100 according to the embodiment of the present disclosure determines the dimming value and transmittance by dividing the block into a number greater than the number of the light sources 252 during local dimming.

That is, when the backlight unit 250 is divided into a plurality of blocks corresponding to the number of the light sources 252 and then driven, the backlight dimming controller 510 may control the brightness of the output image differently for each unit block by dividing each of the plurality of blocks into a plurality of unit blocks.

Figure 11:
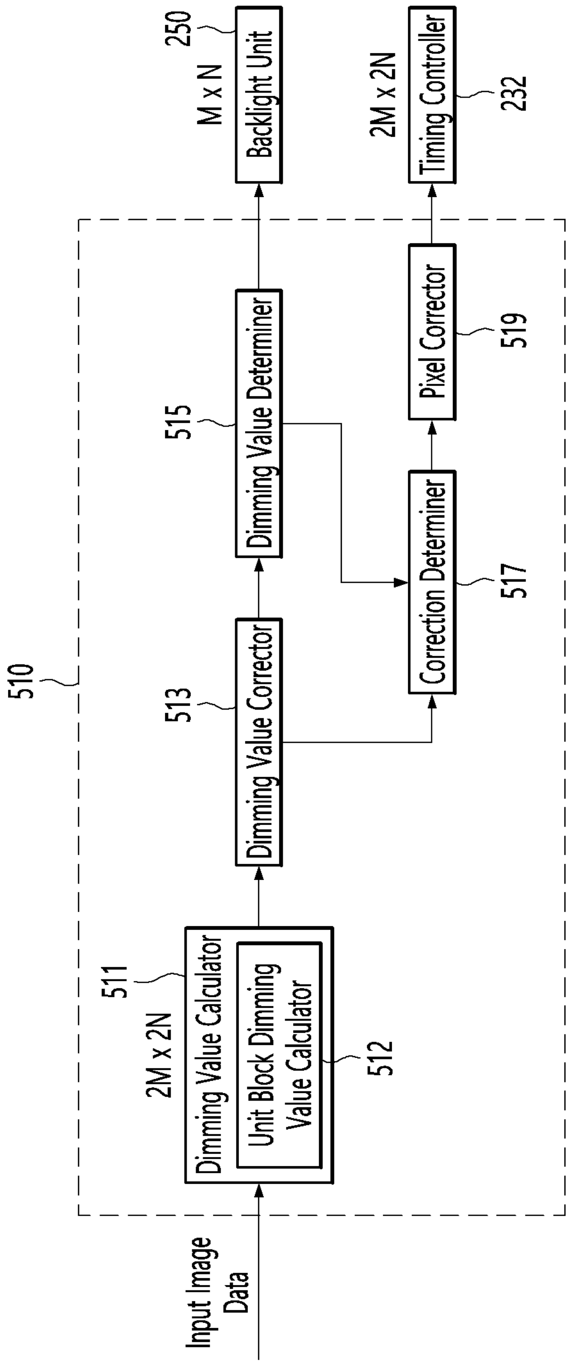
FIG. 11 is a block diagram illustrating an internal configuration of the backlight dimming controller, the backlight unit, and the timing controller for explaining local dimming according to an embodiment of the present disclosure.

FIG. 11 is a block diagram illustrating an internal configuration of the backlight dimming controller, the backlight unit, and the timing controller for explaining local dimming according to an embodiment of the present disclosure.

The backlight dimming controller 510 may include at least part or all of a dimming value calculator 511, a dimming value corrector 513, a dimming value determiner 515, a correction determiner 517, and a pixel corrector 519. Meanwhile, detailed components of the backlight dimming controller 510 illustrated in FIG. 11 may be only classified so as to describe the role of the backlight dimming controller 510. Therefore, it is reasonable that the detailed configuration of the backlight dimming controller 510 is not limited to that illustrated in FIG. 11, and part of the detailed configuration illustrated in FIG. 11 may be omitted or further added.

The dimming value calculator 511 may calculate the dimming values of the plurality of blocks. In particular, the dimming value calculator 511 may calculate the dimming values of the plurality of blocks divided into a number greater than the number of light sources 252.

When the number of light sources 252 is M×N, the dimming value calculator 511 may calculates the dimming value by dividing the block into M×N blocks corresponding to the number of light sources 252, and may calculate the dimming values of the plurality of unit blocks by dividing each of the plurality of M×N blocks into a plurality of unit blocks. That is, the dimming value calculator 511 may divide the block into (a*M)×(a*N) unit blocks and may calculate the dimming values of the divided unit blocks. "a" may be any integer.

For example, the dimming value calculator 511 may divide a first block into first to fourth unit blocks and divide a second block into fifth to eighth unit blocks. In this manner, the dimming value calculator 511 may divide a sixteenth block into sixty-first to sixty-fourth unit blocks.

The dimming value calculator 511 may include a unit block dimming value calculator 512 that divides each of a plurality of pre-divided blocks into a plurality of unit blocks and calculates dimming values of the unit blocks.

The dimming value calculator 511 may calculate the dimming values of unit blocks belonging to the same block. In detail, the dimming value calculator 511 may calculates the dimming values of the plurality of blocks, divide each of the plurality of blocks into a plurality of unit blocks, and then calculate the dimming values of the unit blocks. For example, when the dimming value of the first block is 0.5, the dimming values of the first to fourth unit blocks belonging to the first block may be calculated as 0.5.

The dimming value corrector 513 may correct the dimming values of the unit blocks calculated by the dimming value calculator 511, based on the input image data RGB.

The dimming value corrector 513 may correct a dimming value of a unit block corresponding to a boundary region between a bright portion and a dark portion to a small value, based on the input image data. In detail, the dimming value corrector 513 may calculate the dimming values of the plurality of blocks based on the input image data, and correct a dimming value of a unit block corresponding to a boundary region between a bright portion and a dark portion to a value smaller than the calculated dimming value, based on the input image data.

A correction degree of the dimming value may be calculated by a difference in brightness between the bright portion and the dark portion. For example, the dimming value corrector 513 may calculate a higher correction degree of the dimming value as the brightness difference between the bright portion and the dark portion increases, and may calculate a lower correction degree of the dimming value as the brightness difference between the bright portion and the dark portion decreases The dimming value corrector 513 may correct the dimming value of the unit block based on the calculated correction degree of the dimming value.

However, this method is merely an example and the present disclosure is not limited thereto.

The dimming value determiner 515 may reflect the dimming value of the unit block corrected by the dimming value corrector 513 to determine the dimming value of the block to which the unit blocks belong. For example, when one block is divided into $a^2$ unit blocks by the dimming value calculator 511, the dimming value determiner 515 may determine the dimming value of the block to which the unit blocks belong, based on the dimming values of the $a^2$ unit blocks.

According to an embodiment, the dimming value determiner 515 may filter the dimming values of the $a^2$ unit blocks into a certain filter (e.g., a low pass filter (LPF)) and may determine the filtered dimming value as the dimming value of the block to which the unit blocks belong. According to another embodiment, the dimming value determiner 515 may determine an average of dimming values of a plurality of unit blocks as the dimming value of the block to which the unit blocks belong. However, the above-described embodiments are merely examples for convenience of description, and the present disclosure is not limited thereto.

For example, the dimming value determiner 515 may determine the dimming value of the first block based on the dimming values of the corrected first to fourth unit blocks.

The backlight unit 250 may receives the dimming values of the blocks from the dimming value determiner 515, and the light sources 252 may be controlled based on the received dimming value.

Therefore, according to the present disclosure, since the dimming values of the blocks corresponding to the number of light sources 252 are determined through the dimming value calculator 511, the dimming value corrector 513 and the dimming value determiner 515 on the assumption that there are more blocks than the number of light sources 252, the contrast of the image may be corrected more precisely and the blooming problem may be improved.

The correction determiner 517 may determine the correction degree of the transmittance before the pixel corrector 519 adjusts the transmittance based on the dimming value.

The correction determiner 517 may determine the correction degree of transmittance based on the dimming values of the unit blocks corrected by the dimming value corrector 513 and the dimming values of the blocks determined by the dimming value determiner 515.

For example, the correction determiner 517 may determine the correction degree of transmittance of image data corresponding to the first to fourth unit blocks based on the dimming values of the first to fourth unit blocks corrected by the dimming value corrector 513 and the dimming value of the first block determined by the dimming value determiner 515.

When the dimming value of the block (e.g., the first block) to which the unit blocks determined based on the dimming values of the unit blocks (e.g., the first to fourth unit blocks) belong is a representative dimming value, the correction determiner 517 may determine the correction degree of transmittance of the unit block having a dimming value smaller than the representative dimming value to be less than the correction degree of transmittance of the unit block having a dimming value larger than the representative dimming value.

Since the unit block having a dimming value smaller than the representative dimming value is supplied with light that is brighter than the calculated dimming value, the correction degree of transmittance is determined to be low, and since the unit block having a dimming value greater than the representative dimming value is supplied with light that is darker than the calculated dimming value, the correction degree of transmittance is determined to be high. Therefore, the transmittance may be corrected for the adjusted dimming value, and the contrast may be improved accordingly.

The pixel corrector 519 may correct the input image data RGB based on the correction degree of transmittance determined by the correction determiner 517.

The timing controller 232 may adjust the transmittance based on the input image data RGB 'corrected by the pixel corrector 519.

Figure 12:
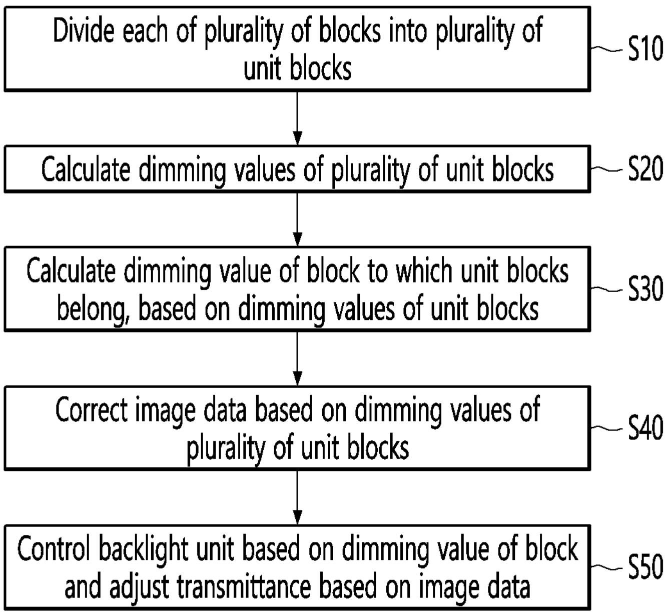
FIG. 12 is a flowchart illustrating an operation method of a display device according to an embodiment of the present disclosure.

FIG. 12 is a flowchart illustrating an operation method of a display device according to an embodiment of the present disclosure.

The backlight dimming controller 510 may divide each of a plurality of blocks into a plurality of unit blocks (S10).

In detail, the backlight dimming controller 510 may divide each of the plurality of blocks divided so as to correspond to the number of light sources 252 into a plurality of unit blocks. The number of unit blocks may be larger than the number of light sources 252.

The backlight dimming controller 510 may calculate the dimming values of the plurality of blocks divided so as to correspond to the number of light sources 252 based on the input image data RGB, and may divide each of the plurality of blocks into a plurality of unit blocks. At this time, the dimming values of the unit blocks may be the same as the dimming value of the block to which the unit blocks belong before division.

The backlight dimming controller 510 may calculate the dimming values of the plurality of unit blocks (S20).

The backlight dimming controller 510 may calculate the dimming values of the plurality of unit blocks by correcting the dimming values of the plurality of unit blocks through the dimming value corrector 513.

The backlight dimming controller 510 may calculate the dimming value of the block to which the unit blocks belong, based on the dimming values of the unit blocks (S30).

The backlight dimming controller 510 may calculate a representative dimming value of the block, to which the unit blocks belong, through the dimming value determiner 515.

The backlight dimming controller 510 may correct image data based on the dimming values of the plurality of unit blocks (S40).

The backlight dimming controller 510 may determine the correction degree of transmittance based on the dimming values of the unit blocks calculated by the dimming value corrector 513 and the representative dimming value determined by the dimming value determiner 515, and correct image data based on the determined correction degree of transmittance.

The backlight unit 250 may control the backlight unit 250 based on the dimming value (representative dimming value) of the block determined by the dimming value determiner 515, and the timing controller 232 may adjust the transmittance based on the image data (S50).

Figure 13:
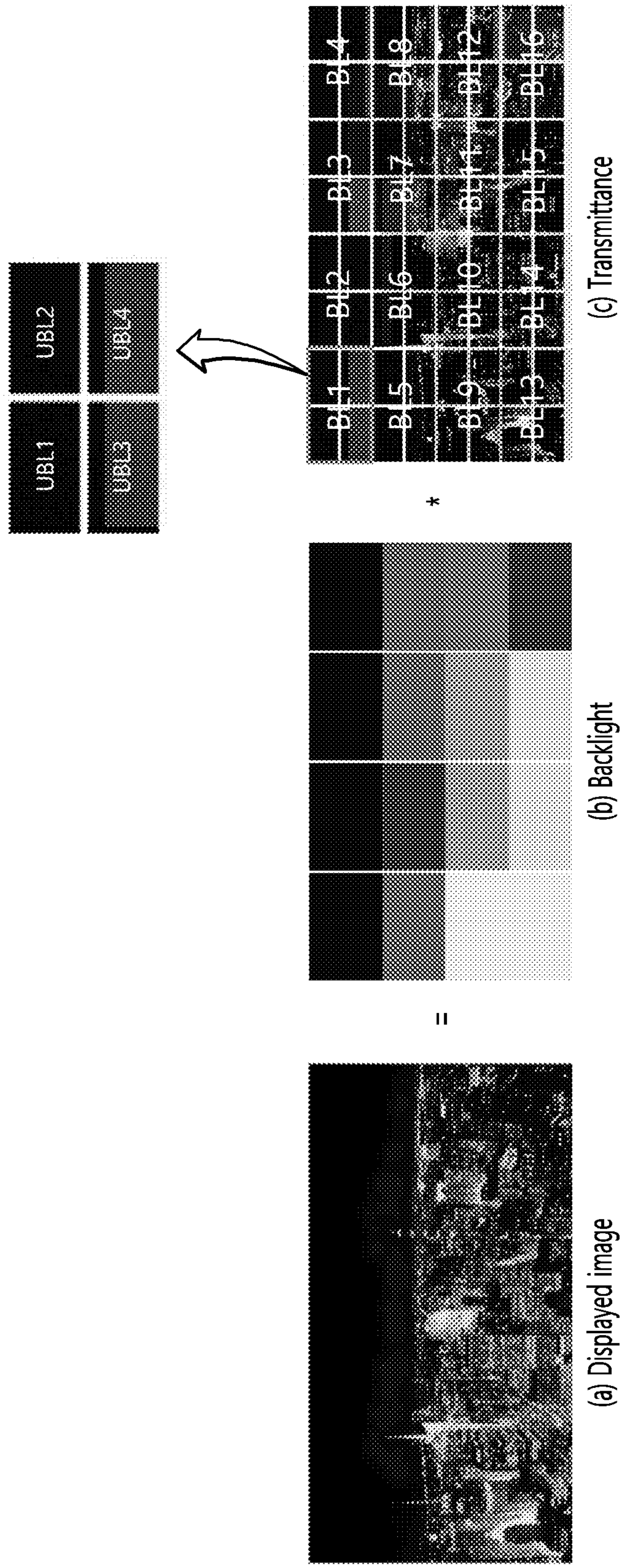
FIG. 13 is an exemplary diagram illustrating a method for displaying an image by local dimming, according to an embodiment of the present disclosure.

FIG. 13 is an exemplary diagram illustrating a method for displaying an image by local dimming, according to an embodiment of the present disclosure.

FIG. 13A is an example of an image output from the display 180, and the image output from the display 180 may be determined by the brightness of the light output by the backlight unit 250 and the transmittance of the liquid crystal layer adjusted by the timing controller 232. FIG. 13B may illustrate the brightness of light of the blocks BL1 to BL16 output by the backlight unit 250, and FIG. 13C may illustrate the transmittance of the liquid crystal layer.

The brightness of the light of the blocks (e.g., BL1 to BL16) output from the backlight unit 250 as illustrated in FIG. 13B may be determined by the dimming values of the blocks through the dimming value determiner 515.

The transmittance of the liquid crystal layer as illustrated in FIG. 13C may be adjusted by the image data of the unit blocks (e.g., the first to sixty-fourth unit blocks UBL1 to UBL64) calculated through the pixel corrector 519.

As described above, when the local dimming is performed on the assumption that there are more unit blocks than the number of light sources 252, the blooming phenomenon is reduced when local dimming is performed according to the block divided by the number of light sources 252

Meanwhile, since users are more sensitive to a change in brightness as they are in a dark environment, the blooming phenomenon may be more easily recognized when the environment is dark than when the environment is bright.

Figure 14:
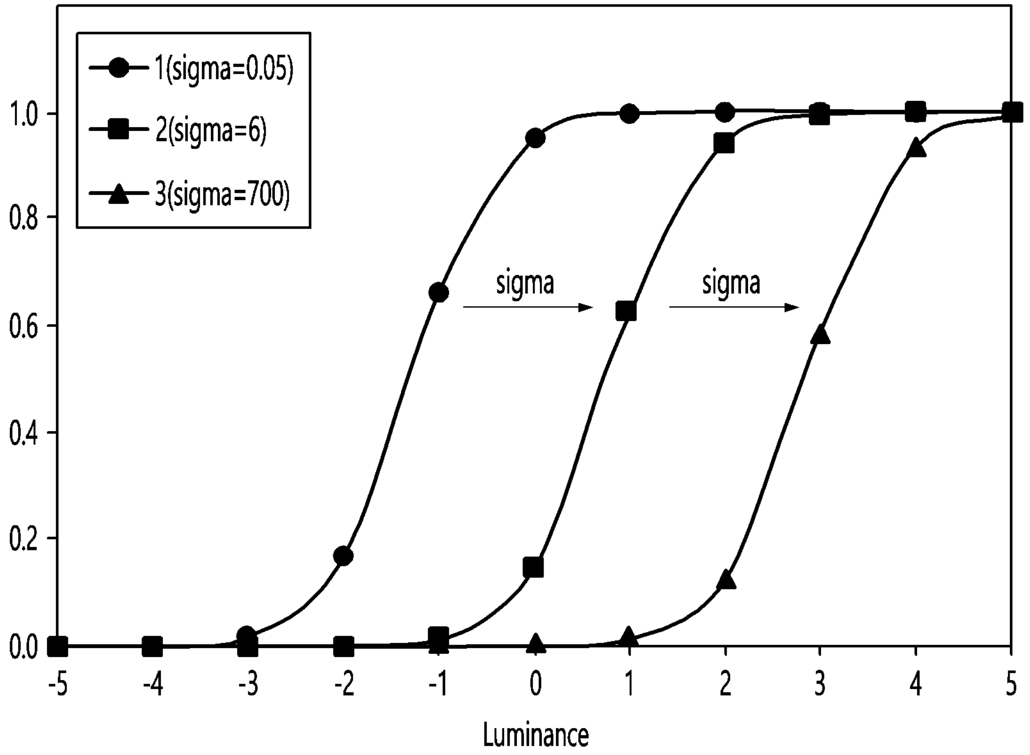
FIG. 14 illustrates an example of a response graph showing brightness perceived by a user according to brightness of a surrounding environment.

FIG. 14 illustrates an example of a response graph showing brightness perceived by a user according to brightness of a surrounding environment.

In FIG. 14, the horizontal axis may represent the brightness applied to the user, and the vertical axis may represent the brightness perceived by the user for each brightness.

A first graph (sigma=0.05) may be a response graph of a user who is in an environment in which surrounding brightness is the darkest, a second graph (sigma=6) may be a response graph of a user who is in an environment in which surrounding brightness is between the environment of the first graph and the environment of a third graph, and the third graph (sigma=700) may be a response graph of a user who is in an environment in which surrounding brightness is the brightest.

Referring to FIG. 14, it can be confirmed that, when the brightness applied to the user is 1, a first user recognizes the brightness as 1, a second user recognizes the brightness as about 0.9, and a third user recognizes the brightness as about zero. That is, it can be confirmed that the user who is in the environment in which the surrounding brightness is darker is more sensitive to the applied brightness.

From this, it can be confirmed that as the environment is darker, the blooming phenomenon occur more seriously. Therefore, when the surrounding environment is somewhat bright, the dimming value is adjusted to be small through the above-described method although it is difficult for the user to recognize the blooming phenomenon. Therefore, only the total brightness of the image is darkened during the local dimming.

Therefore, the display device 100 according to another embodiment of the present disclosure may differently adjust the dimming value according to the brightness of the surrounding environment during the local dimming, thereby minimizing the problem that reduces the total brightness of the image while minimizing the blooming phenomenon.

The display device 100 according to another embodiment of the present disclosure operates as illustrated in FIG. 12, but in operation S20, the display device 100 may calculate the dimming value by adjusting the brightness of the surrounding environment.

Figure 15:
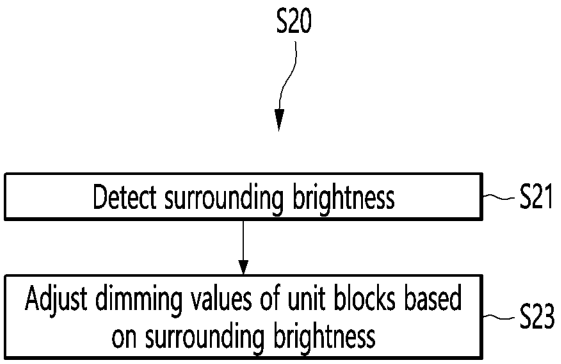
FIG. 15 is a flowchart illustrating a method for adjusting dimming values of a plurality of unit blocks by a display device according to another embodiment of the present disclosure.

FIG. 15 is a flowchart illustrating a method for adjusting dimming values of a plurality of unit blocks by a display device according to another embodiment of the present disclosure.

The backlight dimming controller 510 may acquire surrounding brightness (S21).

According to an embodiment, the display device 100 may further include an illuminance sensor (not illustrated). The illuminance sensor (not illustrated) may detect the surrounding brightness of the display device 100. The backlight dimming controller 510 may acquire the surrounding brightness of the display device 100 by receiving the surrounding brightness detected by the illuminance sensor (not illustrated). However, this method is merely an example, and the backlight dimming controller 510 may acquire surrounding brightness in various ways.

The backlight dimming controller 510 may adjust the dimming value corrected in each of the plurality of unit blocks based on the surrounding brightness (S23).

The backlight dimming controller 510 may enhance the degree of correcting the dimming values of the plurality of unit blocks in operation S20 as the surrounding brightness is darker. That is, the dimming value corrector 513 may strongly correct the dimming values of the unit blocks as the surrounding brightness is darker. Enhancing or strongly correcting the correction degree may mean correcting the dimming value to be smaller.

Therefore, as an example, if the backlight dimming controller 510 corrects the dimming value of the first unit block to the first dimming value when the surrounding brightness is the first brightness, the dimming value of the first unit block may be corrected to the second dimming value smaller than the first dimming value when the surrounding brightness is the second brightness that is darker than the first brightness.

Therefore, since it is difficult for the user to recognize the blooming phenomenon when the surrounding environment is somewhat bright. the display device 100 may slightly correct the dimming value to minimize a case in which the total brightness of the image becomes dark. Since the user can easily recognize the blooming phenomenon when the surrounding environment is slightly dark, the display device 100 may strongly correct the dimming value to improve the blooming problem.

Figure 16:
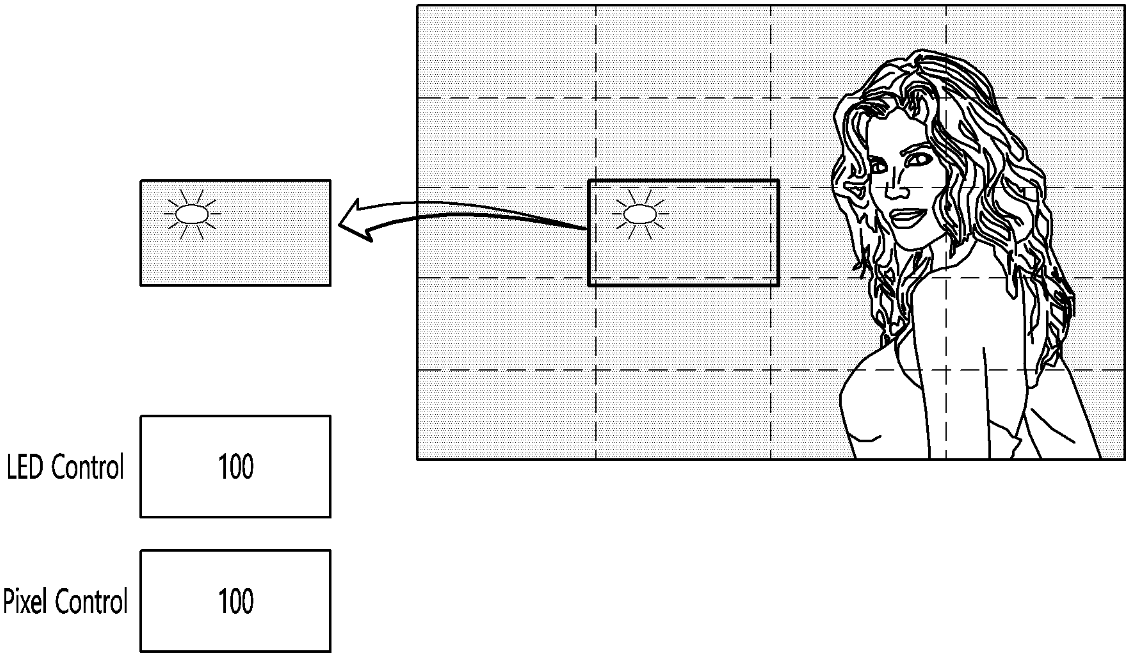
FIG. 16 is an exemplary diagram for explaining brightness of an output image detected by a display device according to comparative example.
Figure 17:
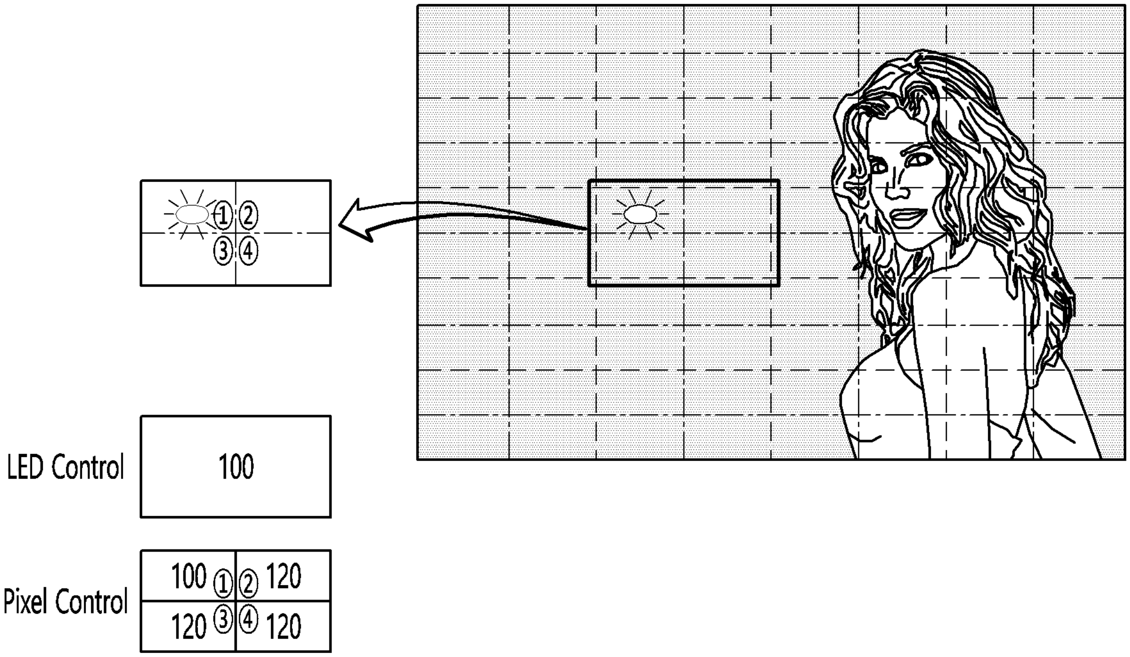
FIG. 17 is an exemplary diagram for explaining brightness of an output image detected by a display device according to an embodiment of the present disclosure.

FIG. 16 is an exemplary diagram for explaining brightness of an output image detected by a display device according to comparative example, and FIG. 17 is an exemplary diagram for explaining brightness of an output image detected by a display device according to an embodiment of the present disclosure.

First, referring to FIG. 16, the display device 100 may divide a screen into a plurality of blocks according to the number of light sources 252 and may output an image according to brightness (LED control) and transmittance (pixel control) determined for each block. Therefore, in this case, the brightness of the output image may be equally detected in the same block.

Meanwhile, referring to FIG. 17, the display device 100 may divide a screen into a plurality of blocks according to the number of light sources 252 and may divide each block into a plurality of unit blocks (e.g., four unit blocks). In this case, the display device 100 outputs an image according to brightness (LED Control) and transmittance (pixel Control) determined for each block. The transmittance within the same block may be different for each unit block. For example, the transmittance of the first unit block may be determined as 100 and the transmittance of the second to fourth unit blocks may be determined as 120. In this case, the brightness of the output image in the first unit block may be different from the brightness of the output image in the second to fourth unit blocks.

As described above, according to the present disclosure, even in the same block, the brightness of the output image may be differently detected for each unit block. As such, since the dimming value and image data are corrected based on unit blocks even in the same block, the dimming value and image data may be adjusted more finely. Therefore, the blooming phenomenon may be improved and the contrast may be improved.

According to the present disclosure, the dimming value of the image and the image data are finely adjusted by dividing the block as if there are more blocks than the number of light sources, thereby minimizing the blooming phenomenon and improving the contrast.

According to the present disclosure, since the dimming value and the image data of the image are adjusted through the virtual unit blocks without increasing the number of light sources, the blooming phenomenon may be improved while minimizing the increase in manufacturing costs.

According to the present disclosure, since the correction degree of the dimming value is adjusted according to the surrounding environment, the brightness of the image may be minimized and the blooming phenomenon may be improved.

The present disclosure may be embodied as computer-readable codes on a program-recorded medium. The computer-readable recording medium may be any recording medium that stores data which can be thereafter read by a computer system. Examples of the computer-readable medium may include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer may include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

What is claimed is:

1. A display device comprising:

a liquid crystal display panel;

a backlight unit including a plurality of light source arrays;

at least one controller; and at least one memory including computer program code, where the at least one memory and the computer program code are configured, with the at least one controller, to cause the display device to at least:

calculate dimming values of the plurality of light source arrays based on the input image data, logically divide each of the plurality of light source arrays into a plurality of unit blocks and control brightness of an output image to be determined independently on each of the unit blocks, calculate dimming values of the plurality of unit blocks, and correct a dimming value of a unit block corresponding to a boundary region between a bright portion and a dark portion among the plurality of unit blocks to be smaller than the calculated dimming value.

2. The display device according to claim 1, wherein brightness of images output through the liquid crystal display panel is differently detected for each of the unit blocks.

3. The display device according to claim 1, wherein the at least one memory and the computer program code are configured, with the at least one controller, to further cause the display device to correct dimming values of the plurality of unit blocks based on input image data.

4. The display device according to claim 1, wherein the at least one memory and the computer program code are configured, with the at least one controller, to further cause the display device to determine an average of the dimming values of the plurality of unit blocks as a representative dimming value of a light source array to which the unit blocks belong.

5. The display device according to claim 1, wherein the at least one memory and the computer program code are configured, with the at least one controller, to further cause the display device to correct the input image data based on dimming values of the plurality of unit blocks.

6. The display device according to claim 5, wherein the at least one memory and the computer program code are configured, with the at least one controller, to further cause the display device to determine a correction degree of the image data based on the dimming values of the unit blocks and a representative dimming value of a light source array to which the unit blocks belong.

7. The display device according to claim 6, wherein the at least one memory and the computer program code are configured, with the at least one controller, to further cause the display device to determine a correction degree of a unit block having a dimming value less than the representative dimming value to be smaller than a correction degree of a unit block having a dimming value larger than the representative dimming value.

8. The display device according to claim 1, wherein the at least one memory and the computer program code are configured, with the at least one controller, to further cause the display device to differently adjust dimming values corrected in the plurality of unit blocks based on surrounding brightness.

9. The display device according to claim 8, wherein the at least one memory and the computer program code are configured, with the at least one controller, to further cause the display device to correct the dimming values of the plurality of unit blocks as the surrounding brightness is darker.

10. The display device according to claim 9, wherein based on correction of a dimming value of a first unit block to a first dimming value when the surrounding brightness is a first brightness, the dimming value of the first unit block is corrected to a second dimming value less than the first dimming value when the surrounding brightness is a second brightness that is darker than the first brightness.

11. The display device according to claim 8, further comprising an illuminance sensor configured to detect the surrounding brightness.

12. The display device according to claim 1, wherein the at least one memory and the computer program code are configured, with the at least one controller, to further cause the display device to:

correct the dimming values of the unit blocks based on the input image data;

determine a representative dimming value of a light source array to which the unit blocks belong, based on the corrected dimming values of the unit blocks;

determine a correction degree of transmittance based on the corrected dimming values of the unit blocks and the determined representative dimming value; and correct the input image data based on the determined correction degree of transmittance.

13. A method for operating a display device, the method comprising:

disposing a plurality of light source arrays for a backlight unit;

calculating dimming values of the plurality of light source arrays based on the input image data; and outputting an image by driving the plurality of light source arrays based on the dimming value, wherein the method further comprises:

logically dividing each of the plurality of light source arrays into a plurality of unit blocks; and calculating dimming values of the plurality of unit blocks; and correcting a dimming value of a unit block corresponding to a boundary region between a bright portion and a dark portion among the plurality of unit blocks to be smaller than the calculated dimming value so that output brightness of the image to be determined independently on each of the unit blocks is controlled.

14. The method according to claim 13, wherein the controlling of the output brightness of the image to be determined independently on each of the unit blocks further comprises determining an average of the dimming values of the plurality of unit blocks as a representative dimming value of a light source array to which the unit blocks belong.

15. The method according to claim 13, wherein the controlling of the output brightness of the image to be determined independently on each of the unit blocks further comprises correcting the input image data based on the dimming values of the plurality of unit blocks.

* * * * *